US005242739A

United States Patent [19]

Kronzer et al.

[11] Patent Number: 5,242,739

[45] Date of Patent: Sep. 7, 1993

[54] IMAGE-RECEPTIVE HEAT TRANSFER PAPER

[75] Inventors: Frances J. Kronzer, Marietta, Ga.; Edward A. Parkkila, Jr., Whetmore, Mich.

[73] Assignee: Kimberly-Clark Corporation, Neenah, Wis.

[21] Appl. No.: 782,685

[22] Filed: Oct. 25, 1991

[51] Int. Cl.[5] ........ B32B 7/06

[52] U.S. Cl. ........ 428/200; 428/195; 428/211; 428/479.3; 428/481; 428/485; 428/507; 428/913

[58] Field of Search ........ 428/195, 154, 207, 407, 428/327, 349, 355, 212, 211, 315.5, 315.9, 321.3, 485, 909, 481, 458, 507, 147, 913, 144, 147, 479.3; 427/146, 148

[56] References Cited

U.S. PATENT DOCUMENTS

| | | | |
|---|---|---|---|
| 3,634,135 | 1/1972 | Osaka et al. | 117/221 |
| 4,107,365 | 8/1978 | Reed et al. | 428/202 |
| 4,351,871 | 9/1982 | Lewis et al. | 428/211 |
| 4,496,618 | 1/1985 | Pernicano | 428/201 |
| 4,513,107 | 4/1985 | Fabbrini | 524/56 |
| 4,517,237 | 5/1985 | Pernicano | 428/198 |
| 4,530,872 | 7/1985 | Pernicano | 428/200 |
| 4,542,078 | 9/1985 | Fitzer et al. | 428/914 |
| 4,670,307 | 6/1987 | Onishi et al. | 428/212 |
| 4,732,815 | 3/1988 | Mizobuchi et al. | 428/484 |
| 4,774,128 | 9/1988 | Koshizuka et al. | 428/212 |
| 4,778,729 | 10/1988 | Mizobuchi | 428/484 |
| 4,826,717 | 5/1989 | Kohashi et al. | 428/143 |
| 4,828,638 | 5/1989 | Brown | 156/234 |
| 4,837,200 | 6/1989 | Kondo et al. | 503/227 |
| 4,863,781 | 9/1989 | Kronzer | 428/211 |
| 4,908,345 | 3/1990 | Egashira et al. | 428/195 |
| 4,946,826 | 8/1990 | Kubo et al. | 503/227 |
| 4,965,132 | 10/1990 | Mizobuchi et al. | 428/411.1 |
| 5,071,823 | 12/1991 | Matsushita et al. | 428/327 |

*Primary Examiner*—Patrick J. Ryan
*Assistant Examiner*—W. Krynski

[57] ABSTRACT

An image-receptive heat transfer paper which includes: (a) a flexible cellulosic nonwoven web base sheet having top and bottom surfaces; and (b) an image-receptive melt-transfer film layer overlaying the top surface of the base sheet, which film layer is composed of from about 15 to about 80 percent by weight of a film-forming binder and from about 85 to about 20 percent by weight of a powdered thermoplastic polymer, wherein each of the film-forming binder and the powdered thermoplastic polymer melts in the range of from about 65 to about 180 degrees Celsius and the powdered thermoplastic polymer consists of particles which are from about 2 to about 50 micrometers in diameter. Alternatively, the image-receptive melt-transfer film layer is replaced with a melt-transfer film layer overlaying the top surface of the base sheet and composed of a film-forming binder which melts in the range of from about 65 to about 180 degrees Celsius, and an image-receptive film layer overlaying the melt-transfer film layer and composed of from about 15 to about 80 percent by weight of a film-forming binder and from about 85 to about 20 percent by weight of a powdered thermoplastic polymer, wherein each of the film-forming binder and the powdered thermoplastic polymer melts in the range of from about 65 to about 180 degrees Celsius and the powdered thermoplastic polymer consists of particles which are from about 2 to about 50 micrometers in diameter.

10 Claims, 1 Drawing Sheet

IMAGE-RECEPTIVE HEAT TRANSFER PAPER

CROSS-REFERENCE TO RELATED APPLICATION

An image-receptive heat transfer paper having at least one film layer comprised of a thermoplastic polymer is described and claimed in copending and commonly assigned application Ser. No. 07/783,437, entitled IMAGE-RECEPTIVE HEAT TRANSFER PAPER, filed of even date in the names of Frank J. Kronzer and Edward A. Parkkila.

BACKGROUND OF THE INVENTION

The present invention relates to a heat transfer paper. More particularly, the present invention relates to a heat transfer paper having an enhanced receptivity for images made by wax-based crayons, thermal ribbon printers, impact ribbon or dot-matrix printers, and the like.

In recent years, a significant industry has developed which involves the application of customer-selected designs, messages, illustrations, and the like (referred to collectively hereinafter as "customer-selected graphics") on articles of clothing, such as T-shirts, sweat shirts, and the like. These customer-selected graphics typically are commercially available products tailored for that specific end-use. The graphics typically are printed on a release or transfer paper. They are applied to the article of clothing by means of heat and pressure, after which the release or transfer paper is removed.

Some effort has been directed to allowing customers the opportunity to prepare their own graphics for application to an article of clothing. A significant amount of this effort has been by Donald Hare and is represented by the five U.S. patents described below.

(1) U.S. Pat. No. 4,224,358 relates to a T-shirt coloring kit. More particularly, the patent is directed to a kit and method for applying colored emblems to T-shirts and the like. The kit includes a heat transfer sheet having an outlined pattern thereon and a plurality of colored crayons formed of a heat transferrable material, such as colored wax. The method of transferring a colored emblem to a T-shirt or the like includes the steps of applying the colored wax to the heat transfer sheet, positioning the heat transfer sheet on a T-shirt or the like, and applying a heated instrument to the reverse side of the heat transfer sheet, thereby transferring the colored wax to the T-shirt or the like. The nature of the heat transfer sheet is not specified.

(2) U.S. Pat. No. 4,284,456, a continuation-in-part of the first patent, relates to a method for transferring creative artwork onto fabric. In this case, the transferable pattern is created from a manifold of a heat transfer sheet and a reverse or lift-type copy sheet having a pressure transferable coating of heat transferable material thereon. By generating the pattern or artwork on the obverse face of the transfer sheet with the pressure of a drafting instrument, a heat transferable mirror image pattern is created on the rear surface of the transfer sheet by pressure transfer from the copy sheet. The heat transferable mirror image then can be applied to a T-shirt or other article by heat transfer. Again, the nature of the heat transfer sheet is not specified.

(3) U.S. Pat. No. 4,773,953 describes a method for creating personalized, creative designs or images on a fabric such as a T-shirt or the like through the use of a personal computer system. The method comprises the steps of:

(a) electronically generating an image;
(b) electronically transferring the image to a printer;
(c) printing the image with the aid of the printer on an obverse surface of a transfer sheet, said transfer sheet including a substrate with a first coating thereon transferable therefrom to the fabric by the application of heat or pressure, and a second coating on said first coating, said second coating defining said obverse face and consisting essentially of Singapore Dammar Resin;
(d) positioning the obverse face of the transfer sheet against the fabric; and
(e) applying energy to the rear of the transfer sheet to transfer the image to the fabric. The transfer sheet can be any commercially available transfer sheet consisting of a substrate having a heat transferable coating, wherein the heat transferable coating has been coated with an overcoating of Singapore Dammar Resin.

(4) U.S. Pat. No. 4,966,815, a division of the immediately preceding patent, describes a transfer sheet for applying a creative design to a fabric. The transfer sheet consists of a substrate, a first coating on the substrate of material which is transferable from the substrate to a receptor surface by the application of heat or pressure, and a second coating on the first coating, the second coating consisting essentially of Singapore Dammar Resin.

(5) U.S. Pat. No. 4,980,224 is a continuation-in-part of U.S. Pat. No. 4,773,953, described above, and an abandoned application. The patent describes a method and transfer sheet for transferring creative and personalized designs onto a T-shirt or similar fabric. The design can be created manually, electronically, or a combination of both using personal computers, video cameras, or electronic photocopiers. The transfer sheet in essence is the transfer sheet of U.S. Pat. No. 4,966,815 with the addition of abrasive particles to the Singapore Dammar Resin coating. The abrasive particles serve to enhance the receptivity of the transfer sheet to various inks and wax-based crayons. The patent specifically mentions the use of white silica sand and sugar as the abrasive particles.

In addition to the foregoing references, several references are known which relate generally to the transfer of an image-bearing laminate to a substrate.

U.S. Pat. No. 4,555,436 to Guertsen et al. relates to a heat transferable laminate. The patent describes an improved release formulation for use in a heat transferable laminate wherein an ink design image is transferred from a carrier to an article by the application of heat to the carrier support. On transfer the release splits from the carrier and forms a protective coating over the transferred design. The improved release is coated onto the carrier as a solvent-based wax release. The release coating then is dried to evaporate the solvent contained therein. The improved release is stated to have the property that its constituents remain in solution down to temperatures approaching ambient temperature. Upon transfer, the release forms a protective coating which may be subjected to hot water. The improved release contains a montan wax, a rosin ester or hydrocarbon resin, a solvent, and ethylene-vinyl acetate copolymer having a low vinyl acetate content. U.S. Pat. No. 4,235,657 to Greenman et al. relates to a melt transfer web. The web is useful for transferring preprinted inked graphic patterns onto natural or synthetic base fabric sheets, as well as other porous, semi-porous, or non-porous material workpieces. The transfer web is comprised of a flexible, heat-stable substrate, preferably a saturated paper having a top surface coated with a first film layer of a given polymer serving as a heat-separable layer, and a second film layer superposed on the first film layer and comprised of another given polymer selected to cooperate with the first film layer to form a laminate having specific adhesion to porous, semi-porous, or non-porous materials when heat softened. The desired pattern or design is printed on the coated surface, i.e., the second film layer.

U.S. Pat. No. 4,863,781 to Kronzer also describes a melt transfer web. In this case, the web has a conformable layer which enables the melt transfer web to be used to transfer print uneven surfaces. In one embodiment, the melt transfer web has a separate conformable layer and a separate release layer. The conformable layer consists of copolymers of ethylene and vinyl acetate or copolymers of ethylene and acrylic acid, which copolymers have a melt index greater than 30. The release layer consists of polyethylene films or ethylene copolymer films. In another embodiment, a single layer of copolymers of ethylene and acrylic acid having a melt index between 100 and 4000 serves as a conformable release layer.

Finally, it may be noted that there are a large number of references which relate to thermal transfer papers. Most of them relate to materials containing or otherwise involving a dye and/or a dye transfer layer, a technology which is quite different from that of the present invention.

Notwithstanding the progress which has been made in recent years in the development of heat transfer papers, there still is a need for an improved heat transfer paper for use in industries based on the application of customer-designed graphics to fabrics. The prior art heat transfer papers either are not particularly well suited for use in transferring customer-designed graphics or they produce stiff, gritty, and/or rubbery images on fabric.

SUMMARY OF THE INVENTION

It therefore is an object of the present invention to provide an improved heat transfer paper having an enhanced receptivity for images made by wax-based crayons, thermal ribbon printers, impact ribbon or dot-matrix printers, and the like.

This and other objects will be apparent to one having ordinary skill in the art from a consideration of the specification and claims which follow.

Accordingly, the present invention provides an image-receptive heat transfer paper which comprises:

(a) a flexible cellulosic nonwoven web base sheet having top and bottom surfaces; and (b) an image-receptive melt-transfer film layer overlaying the top surface of said base sheet, which image-receptive melt-transfer film layer comprises from about 15 to about 80 percent by weight of a film-forming binder and from about 85 to about 20 percent by weight of a powdered thermoplastic polymer, wherein each of said film-forming binder and said powdered thermoplastic polymer melts in the range of from about 65 to about 180 degrees Celsius and said powdered thermoplastic polymer consists of particles which are from about 2 to about 50 micrometers in diameter.

The present invention also provides an image-receptive heat transfer paper which comprises:

(a) a flexible cellulosic nonwoven web base sheet having top and bottom surfaces;

(b) a melt-transfer film layer overlaying the top surface of said base sheet, which melt transfer film layer comprises a film-forming binder which melts in the range of from about 65 to about 180 degrees Celsius; and (c) an image-receptive film layer overlaying said melt-transfer film layer, which image-receptive film layer comprises from about 15 to about 80 percent by weight of a binder and from about 85 to about 20 percent by weight of a powdered thermoplastic polymer, wherein each of said film-forming binder and said powdered thermoplastic polymer melts in the range of from about 65 to about 180 degrees Celsius and said powdered thermoplastic polymer consists of particles which are from about 2 to about 50 micrometers in diameter.

In preferred embodiments, the flexible cellulosic nonwoven web base sheet is a latex-impregnated paper. In other preferred embodiments, the powdered thermoplastic polymer is selected from the group consisting of polyolefins, polyesters, and ethylene-vinyl acetate copolymers. In still other preferred embodiments, each of the film-forming binder and the powdered thermoplastic polymer melt in the range of from about 80 to about 120 degrees Celsius.

DETAILED DESCRIPTION OF THE INVENTION

Figure 1:
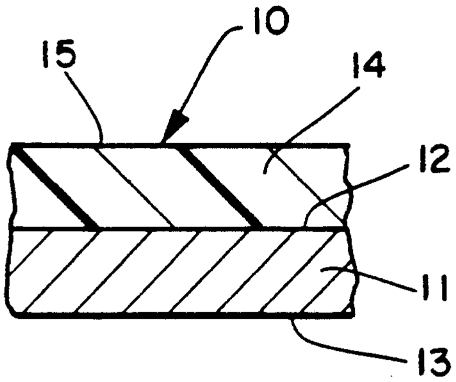
FIG. 1 is a fragmentary sectional view of a first embodiment of an image-receptive heat transfer paper made in accordance with the present invention.

Referring to the drawings for the purpose of illustrating the present invention, there is shown in FIG. 1 a fragmentary section of image-receptive heat transfer paper 10. Paper 10 comprises cellulosic nonwoven web base sheet 11 and image-receptive melt-transfer film layer 14 having exposed surface 15. Base sheet 11 has top surface 12 and bottom surface 13. Film layer 14 overlays top surface 12 of base sheet 11. An image to be transferred (not shown) is applied to surface 15 of film layer 14.

Figure 2:
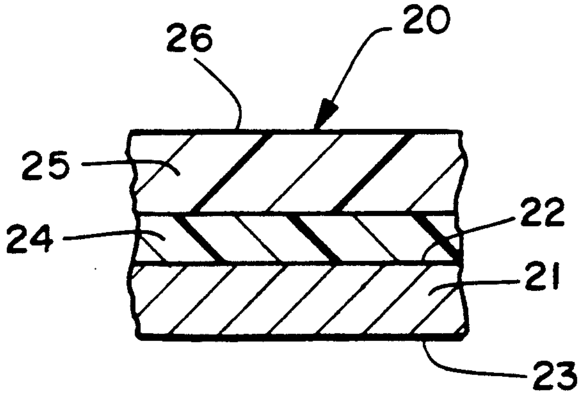
FIG. 2 is a fragmentary sectional view of a second embodiment of an image-receptive heat transfer paper made in accordance with the present invention.

As shown in FIG. 1, the image-receptive heat-transfer film layer is a single film layer. If desired, however, such film layer can be separated into a melt-transfer film layer and an image-receptive film layer; this embodiment is shown in FIG. 2. In FIG. 2, a fragmentary section of image-receptive heat transfer paper 20 is shown. Paper 20 comprises cellulosic nonwoven web base sheet 21, melt-transfer film layer 24, and image-receptive film layer 25 having exposed surface 26. Base sheet 21 has top surface 22 and bottom surface 23. Film layer 24 overlays top surface 22 of base sheet 21 and film layer 25 in turn overlays film layer 24. An image to be transferred (not shown) is applied to surface 26 of film layer 25.

The image-receptive heat transfer paper of the present invention is based on a flexible cellulosic nonwoven web base sheet having top and bottom surfaces. Such base sheet is not known to be critical, provided it has sufficient strength for handling, coating, sheeting, and other operations associated with its manufacture, and for removal after transferring an image. The base sheet typically is a paper such as is commonly used in the manufacture of heat transfer papers.

In preferred embodiments, the base sheet will be a latex-impregnated paper. By way of illustration, a preferred paper is a water leaf sheet of wood pulp fibers or alpha pulp fibers impregnated with a reactive acrylic polymer latex such as Rhoplex ® B-15 (Rohm and Haas Company, Philadelphia, Pa.). However, any of a number of other latexes can be used, if desired, some examples of which are summarized in Table I, below.

TABLE I

Suitable Latexes for Base Sheet

| Polymer Type | Product Identification |
|---|---|
| Polyacrylates | Hycar ® 26083, 26084, 26120, 26104, 26106, 26322<br>B. F. Goodrich Company<br>Cleveland, Ohio<br>Rhoplex ® HA-8, HA-12, NW-1715<br>Rohm and Haas Company<br>Philadelphia, Pennsylvania<br>Carboset ® XL-52<br>B. F. Goodrich Company<br>Cleveland, Ohio |
| Styrene-butadiene copolymers | Butofan ® 4264<br>BASF Corporation<br>Sarnia, Ontario, Canada<br>DL-219, DL-283<br>Dow Chemical Company<br>Midland, Michigan |
| Ethylene-vinylacetate copolymers | Dur-0-Set ® E-666, E-646, E-669<br>National Starch & Chemical Co.<br>Bridgewater, New Jersey |
| Nitrile rubbers | Hycar ® 1572, 1577, 1570 × 55<br>B. F. Goodrich Company<br>Cleveland, Ohio |
| Poly(vinyl chloride) | Geon ® 552<br>B. F. Goodrich Company<br>Cleveland, Ohio |
| Poly(vinyl acetate) | Vinac XX-210<br>Air Products and Chemicals, Inc.<br>Napierville, Illinois |
| Ethylene-acrylatecopolymers | Michem ® Prime 4990<br>Michelman, Inc.<br>Cincinnati, Ohio<br>Adcote 56220<br>Morton Thiokol, Inc.<br>Chicago, Illinois |

The impregnating dispersion typically also will contain clay and a delustrant such as titanium dioxide. Typical amounts of these two materials are 16 parts and 4 parts, respectively, per 100 parts of polymer on a dry weight basis. An especially preferred base sheet has a basis weight of 13.3 lbs/1300 $ft^2$ (50 $g/m^2$) before impregnation. The impregnated paper preferably contains 18 parts impregnating solids per 100 parts fiber by weight, and has a basis weight of 15.6 lbs/1300 $ft^2$ (58 $g/m^2$), both on a dry weight basis. A suitable caliper is 3.8 mils±0.3 mil (97±8 micrometers).

The base sheet is readily prepared by methods which are well known to those having ordinary skill in the art. In addition, paper-impregnating techniques also are well known to those having ordinary skill in the art. Typically, a paper is exposed to an excess of impregnating dispersion, run through a nip, and dried.

The image-receptive melt-transfer film layer overlaying the top surface of the flexible cellulosic nonwoven web comprises from about 15 to about 80 percent by weight of a film-forming binder and from about 85 to about 20 percent by weight of a powdered thermoplastic polymer. Each of the film-forming binder and powdered thermoplastic polymer melts in the range of from about 65 to about 180 degrees Celsius (°C.) In addition, the powdered thermoplastic polymer is composed of particles having diameters of from about 2 to about 50 micrometers.

In preferred embodiments, the thickness of the image-receptive melt-transfer film layer is from about 12 to about 80 micrometers. In other preferred embodiments, each of the film-forming binder and powdered thermoplastic polymer melt in the range of from about 80° C. to about 120° C.

The function of the powdered thermoplastic polymer is two-fold. First, the powdered thermoplastic polymer greatly improves the receptivity of the film surface to crayons. Second, the melting of the individual polymer particles unexpectedly improves the transfer of an image to a fabric, both in terms of ease of transfer and the permanence of the transferred image.

The nature of the film-forming binder is not known to be critical. That is, any film-forming binder can be employed so long as it meets the criteria specified herein. In preferred embodiments, the film-forming binder has, at the transfer temperature, a lower melt viscosity than the powdered thermoplastic polymer. As a practical matter, water-dispersible ethylene-acrylic acid copolymers have been found to be especially effective film-forming binders.

In general, the powdered thermoplastic polymer can be any thermoplastic polymer which meets the criteria set forth herein. Preferably, the powdered thermoplastic polymer is selected from the group consisting of polyolefins, polyesters, and ethylene-vinyl acetate copolymers.

The term "melts" and variations thereof are used herein only in a qualitative sense and are not meant to refer to any particular test procedure. Reference herein to a melting temperature or range is meant only to indicate an approximate temperature or range at which the film-forming binder and/or powdered thermoplastic polymer melt and flow under the conditions of the melt-transfer process to result in a substantially smooth film. In so doing, such materials, and especially the powdered thermoplastic polymer, flow partially into the fiber matrix of the fabric to which an image is being transferred. The result is a fabric having an image which does not render the fabric stiff. Moreover, the image itself is neither rubbery nor rough to the feel and is stable to repeated washings.

Manufacturers' published data regarding the melt behavior of film-forming binders or powdered thermoplastic polymers correlate with the melting requirements described herein. It should be noted, however, that either a true melting point or a softening point may be given, depending on the nature of the material. For example, materials such a polyolefins and waxes, being composed mainly of linear polymeric molecules, generally melt over a relatively narrow temperature range since they are somewhat crystalline below the melting point.

Melting points, if not provided by the manufacturer, are readily determined by known methods such as differential scanning calorimetry. Many polymers, and especially copolymers, are amorphous because of branching in the polymer chains or the side-chain constituents. These materials begin to soften and flow more gradually as the temperature is increased. It is believed that the ring and ball softening point of such materials, as determined by ASTM E-28, is useful in predicting their behavior in the present invention. Moreover, the melting points or softening points described are better indicators of performance in this invention than the chemical nature of the polymer.

If desired, as already noted, the image-receptive melt-transfer film layer can be separated into a melt-transfer film layer and an image-receptive film layer. In this instance, the melt-transfer film layer overlays the top surface of the nonwoven web base sheet and the image-receptive film layer overlays the melt transfer film layer.

The melt-transfer film layer comprises a film-forming binder as already described. The image-receptive film layer comprises from about 15 to about 80 percent by weight of a film-forming binder and from about 85 to about 20 percent by weight of a powdered thermoplastic polymer, each of which are as already defined.

As a general rule, the amount of powdered thermoplastic polymer employed in either the image-receptive melt-transfer film layer or the image-receptive film layer can be reduced if larger particle sizes are employed. For example, 23 percent by weight of a powdered thermoplastic polymer having approximately 40-micrometer particles gave a satisfactory image-receptive surface. However, 28.5 percent of a powdered thermoplastic polymer having particle sizes of about 20 micrometers did not give a suitable image-receptive surface.

If desired, any of the foregoing film layers can contain other materials, such as processing aids, release agents, pigments, deglossing agents, antifoam agents, and the like. The use of these and other like materials is well known to those having ordinary skill in the art.

The image-receptive melt-transfer film layer or the melt-transfer and image-receptive film layers are formed on the base sheet by known coating techniques, such as by roll, blade, and air-knife coating procedures. The resulting paper then is dried by means of, for example, steam-heated drums, air impingement, radiant heating, or some combination thereof. Some care must be exercised, however, to assure that drying temperatures are sufficiently low so that the powdered thermoplastic polymer present in either the image-receptive melt-transfer film layer or the image-receptive film layer does not melt during the drying process.

The present invention is further defined by the examples which follow. Such examples, however, are not to be construed as limiting in any way either the spirit or scope of the present invention. Whenever possible, units of measurement will be expressed as SI units (International System of Units), whether Basic or Derived. Unless indicated otherwise, all parts are parts by weight and all basis weights are on a dry-weight basis. When the drying of a coating is specified in an example, a Model 28 Precision Scientific Electric Drying Oven was used.

EXAMPLES

A number of different base sheets, binders, and powdered thermoplastic polymers were employed in the examples. In some examples, a separate coating was applied to the bottom surface; such coating is referred to herein as a backsize coating. In one example, a barrier coating was applied between the base sheet and subsequent layers. For convenience, all of these materials are described first.

Base Sheet A

Base Sheet A, the preferred base sheet described earlier, is a latex-impregnated paper. The base sheet is a water leaf sheet of wood pulp fibers impregnated with an acrylic polymer latex, Rhoplex® B-15 (Rohm and Haas Company, Philadelphia, Pa.). The impregnating dispersion also contained clay and titanium dioxide at levels of 16 parts and 4 parts, respectively, per 100 parts of polymer on a dry weight basis. The pH of the impregnating dispersion was adjusted by adding 0.21 part of ammonia per 100 parts of polymer (ammonia was added as a 28 percent aqueous ammonia solution). The paper had a basis weight of 13.3 lbs/1300 $ft^2$ (50 $g/m^2$) before impregnation. The impregnated paper contains 18 parts impregnating solids per 100 parts fiber by weight, and has a basis weight of 15.6 lbs/1300 $ft^2$ (59 $g/m^2$). The caliper of the impregnated paper is 3.8 mils (97 micrometers).

Base Sheet B

This base sheet is a water leaf sheet of wood pulp fibers impregnated with a styrene-butadiene copolymer (SBR) latex, DL-219 (Dow Chemical Company, Midland, Mich.). The impregnating dispersion also contained 0.5 part ammonia (added as a 28 percent aqueous ammonia solution), 1 part emulsion stabilizer, and 2 parts of a water repellant per 100 parts of copolymer, all on a dry weight basis. The impregnated paper contains 40 parts impregnating solids per 100 parts fiber by weight, and has a basis weight of 17 lbs/1300 $ft^2$ (64 $g/m^2$). The caliper of the impregnated paper was 4.0 mils (102 micrometers).

Base Sheet C

Base sheet C is a water leaf sheet of wood pulp fibers impregnated with Hycar® 26083 (B. F. Goodrich Chemical Company, Cleveland, Ohio). The paper had a basis weight of 13.1 lbs/1300 $ft^2$ (50 $g/m^2$) before impregnation and 16.4 lbs/1300 $ft^2$ (64 $g/m^2$) after impregnation (27 parts latex addon). The caliper of the impregnated paper was 4 mils (102 micrometers).

Binder A

Binder A was Michem® 58035, supplied by Michelman, Inc., Cincinnati, Ohio. This is a 35 percent solids dispersion of Allied Chemical's AC 580, which is approximately 10 percent acrylic acid and 90 percent ethylene. The polymer reportedly has a softening point of 102° C. and a Brookfield viscosity of 0.65 Pa s (650 centipoise) at 140° C.

Binder B

This binder was Michem® Prime 4983 (Michelman, Inc., Cincinnati, Ohio). The binder is a 25 percent solids dispersion of Primacor® 5983 made by Dow Chemical Company. The polymer contains 20 percent acrylic acid and 80 percent ethylene. The copolymer had a Vicat softening point of 43° C. and a ring and ball softening point of 100° C. The melt index of the copolymer was 500 g/10 minutes (determined in accordance with ASTM D-1238).

Binder C

Binder C is Michem® 4990 (Michelman, Inc., Cincinnati, Ohio). The material is 35 percent solids dispersion of Primacor ® 5990 made by Dow Chemical Company. Primacor ® 5990 is a copolymer of 20 percent acrylic acid and 80 percent ethylene. It is similar to Primacor ® 5983 (see Binder B), except that the ring and ball softening point is 93° C. The copolymer had a melt index of 1,300 g/10 minutes and a Vicat softening point of 39° C.

Binder D

This binder is Michem ® 37140, a 40 percent solids dispersion of a Hoechst-Celanese high density polyethylene. The polymer is reported to have a melting point of 100° C.

Binder E

This binder is Michem ® 32535 which is an emulsion of Allied Chemical Company's AC-325, a high density polyethylene. The melting point of the polymer is about 138° C. Michem ® 32535 is supplied by Michelman, Inc, Cincinnati, Ohio.

Binder F

Binder F is Michem ® 48040, an emulsion of an Eastman Chemical Company microcrystalline wax having a melting point of 88° C. The supplier is Michelman, Inc, Cincinnati, Ohio.

Powdered Thermoplastic Polymer A

This powdered polymer is Microthene ® FE 532, an ethylenevinyl acetate copolymer supplied by USI Chemicals Co., Cincinnati, Ohio. The particle size is reported to be 20 micrometers. The Vicat softening point is 75° C. and the melt index is 9 g/10 minutes.

Powdered Thermoplastic Polymer B

Powdered Thermoplastic Polymer B is Aqua Polysilk 19. It is a micronized polyethylene wax containing some polytetrafluoroethylene. The average particle size is 18 micrometers and the melting point of the polymer is 102°-118° C. The material was supplied by Micro Powders, Inc., Scarsdale, N.Y.

Powdered Thermoplastic Polymer C

This material is Microthene ® FN-500, a polyethylene powder supplied by USI Chemicals Co., Cincinnati, Ohio. The material has a particle size of 20 micrometers, a Vicat softening point of 83° C., and a melt index of 22 g/10 minutes.

Powdered Thermoplastic Polymer D

This polymer was Aquawax 114, supplied by Micro Powders, Inc., Scarsdale, N.Y. The polymer has a reported melting point of 91°-93° C. and an average particle size of 3.5 micrometers; the maximum particle size is stated to be 13 micrometers.

Powdered Thermoplastic Polymer E

Powdered Thermoplastic Polymer E is Corvel ® 23-9030, a clear polyester from the Powder Coatings Group of the Morton Chemical Division, Morton Thiokol, Inc., Reading, Pa.

Powdered Thermoplastic Polymer F

This material is Corvel ® natural nylon 20-9001, also supplied by Morton Thiokol, Inc.

Powdered Thermoplastic Polymer G

This polymer powder is Corvel ® clear epoxy 13-9020, supplied by Morton Thiokol, Inc.

Powdered Thermoplastic Polymer H

Powdered Thermoplastic Polymer H is AClyn ® 246A, which has a melting temperature of about 95° C. as determined by differential scanning calorimetry. The polymer is an ethylene-acrylic acid magnesium ionomer. The material is supplied by Allied-Signal, Inc., Morristown, N.J.

Powdered Thermoplastic Polymer I

This polymer is AC-316A, an oxidized high density polyethylene. The material is supplied by Allied Chemical Company, Morristown, N.J.

Powdered Thermoplastic Polymer J

This polymer is Texture 5380, supplied by Shamrock Technologies, Inc., Newark, N.J. It is a powdered polypropylene having a melting point of 165° C. and an average particle size of 40 micrometers. cl Backsize A Backsize A consisted essentially of a binder and clay. The binder is Rhoplex HA-16 (Rohm and Haas Company, Philadelphia, Pa.), a polyacrylate. The clay is Ultrawhite 90 (Englehard, Charlotte, N.C.). The two materials were mixed in amounts of 579.7 parts and 228.6 parts, respectively. Water and/or a thickening agent were added as necessary to give a final dispersion viscosity in the range of 0.100–0.140 Pa s (100–140 centipoise) at ambient temperature.

Barrier A

Barrier A consisted of a dispersion consisting essentially of 208 parts of Hycar ® 26084 (B. F. Goodrich Company, Cleveland, Ohio), a polyacrylate dispersion having a solids content of 50 percent by weight (104 parts dry weight), 580 parts of a clay dispersion having a solids content of 69 percent by weight (400 parts dry weight), and 100 parts of water. Water and/or a thickening agent were added as necessary to give a final dispersion viscosity in the range of 0.100–0.140 Pa s (100–140 centipoise) at ambient temperature.

Unless noted otherwise, crayon images were created on the heat transfer paper with either Sargent crayons (Sargent Art, Inc., Hazleton, Pa.) or Crayola ® Brand crayons (Binney & Smith, Inc., Easton, Pa.). No significant differences were noted between the two brands of crayons. Images were transferred to Haynes ® Brand 100 percent cotton T-shirts or their equivalent. Washing tests were carried out in a Speed Queen ® automatic washing machine, Model No. NA3310W, using a liquid laundry detergent (Era ®, Wisk ®, or Yes ®) and cold water in both the wash and rinse cycles. Each shirt was turned inside out and placed in a normal load of laundry. After washing, the shirts were dried in a General Electric gas dryer on automatic setting (Model No. DDG6380VALWH). Image transfer involved the use of either a Casco ® brand non-steam home hand iron set at about 163°-177° C. and/or a cotton setting or a Model S-600 heat transfer press (Hix Corporation, Pittsburgh, Kans.).

EXAMPLE 1

A mixture of 300 parts of Binder A (105 parts dry weight), 80 parts of Powdered Thermoplastic Polymer A, and 0.20 parts of Zonyl 7040 (a fluorocarbon dispersion obtained from E. I. duPont de Nemours and Company, Wilmington, Del.) were blended in a standard laboratory colloid mill. The resulting dispersion was applied to Base Sheet B by means of a No. 38 Meyer rod to give a nominal 3.8-mil (96-micrometer) wet coating. The coating then was dried at 80° C. for 45–75 seconds to give an image-receptive melt-transfer film layer. The No. 38 Meyer rod imparted 10 lbs/1300 ft$^2$ (38 g/m$^2$) of coating. The film layer accepted a crayon image well and transfer to fabric was adequate. Although some of the film layer tended to remain on the base sheet, the base sheet was readily removed after completing the transfer process. This type of heat transfer paper is exemplified by FIG. 1.

The procedure with Base Sheet B was repeated two more times. In the first repeat trial, the amount of Polymer A was reduced to 40 parts. The resulting dried image-receptive melt-transfer film layer had poor crayon acceptance. In the second repeat trial, the amount of Polymer A was kept at 80 parts, but Base Sheet B first was coated with Binder A by means of a No. 42 Meyer rod to give a nominal 3.8-mil (96-micrometer) wet coating. The coating was dried as described above to give a melt-transfer film layer. An image-receptive film layer then was formed over the melt-transfer film layer and dried as first described in this example. Crayon acceptance still was good, and the transfer process was improved; that is, the image transferred to fabric well and the base sheet was released readily and cleanly from the transferred layers. The heat transfer paper from the second repeat trial is exemplified by FIG. 2.

EXAMPLE 2

Base Sheet B was coated on the bottom surface with Backsize A at a level of 5.0 lbs/1300 ft$^2$ (19 g/m$^2$) by means of a No. 12 Meyer rod. The backsize coating was dried at 107° C. for 60–90 seconds. The top surface of the resulting backsized base sheet then was coated with Binder A at a level of 2.5 lbs/1300 ft$^2$ (9 g/m$^2$) by means of a No. 10 Meyer rod. The coating was dried at 80° C. for 45–75 seconds to form a melt-transfer film layer. A second coating was applied to the top surface over the melt-transfer film layer. The coating dispersion was a mixture of 400 parts of Binder B (100 parts dry weight) and 70 parts of Polymer B. The mixture was blended in a colloid mill as described in Example 1. The coating dispersion was applied by means of a No. 40 Meyer rod and dried at 80° C. for 45–75 seconds to give an image-receptive film layer. The image-receptive film layer level was 8.5 lbs/1300 ft$^2$ (32 g/m$^2$). The image-receptive film layer accepted crayon very well. The two layers released completely and ease of release was excellent.

EXAMPLE 3

The procedure of Example 2 was repeated, except that the image-receptive film layer was formed from a dispersion consisting of 286 parts of Binder A (100 parts dry weight) and 65 parts of Polymer C. The resulting heat transfer paper accepted crayon well and transferred images well. Ease of removal of the base sheet was adequate.

EXAMPLE 4

The backsized base sheet of Example 2 was coated with a dispersion consisting of 400 parts of Binder B (100 parts dry weight) and 70 parts of Polymer D. Dispersion preparation and coating were carried out as described in Example 1, using a No. 38 Meyer rod. Crayon acceptance of the film layer was almost as good as with the heat transfer papers of the preceding examples. Both ease and completeness of release were adequate.

Crayon images transferred to T-shirts using the heat release papers of Examples 1–4, inclusive, went through six washings without a significant loss of color.

EXAMPLE 5

Pilot Coater Trial

The procedure of Example 2 was repeated, except that the image-receptive film layer was prepared from the dispersion of Example 1 from which the Zonyl 7040 had been omitted. The image-receptive film layer was applied at a level of 8.5–12 lbs/1300 ft$^2$ (32–45 g/m$^2$). All coatings on the base sheet were accomplished with a Faustel coater (Faustel, Inc., Germantown, Wis.). The performance of the resulting heat transfer paper was excellent.

EXAMPLE 6

Base Sheet B was coated on the top surface with Binder C, using a No. 10 Meyer rod, and dried at 107° C. for 60–90 seconds. The resulting melt-release film layer was present at a level of about 3 lbs/1300 ft$^2$ (11 g/m$^2$). A dispersion was prepared as described in Example 1 from 200 parts of Binder C (70 parts dry weight), 20 parts propylene glycol, 20 parts water, and 35 parts of Polymer E. The dispersion was applied over the melt-release film layer using a No. 38 Meyer rod. After drying at 80° C. for 45–75 seconds, the resulting image-receptive film layer was present at a level of 7.8 lbs/1300 ft$^2$ (29 g/m$^2$). The image-receptive film layer accepted crayon well, with adequate transfer to T-shirt fabric at 163° C. for 25 seconds with the Hix press described earlier. The fabric did not feel overly brittle and the transferred image/film layers combination penetrated the fabric without any problems.

EXAMPLE 7

A dispersion was prepared as described in Example 6, except that Polymer E was replaced with 54 parts of Polymer F. The top surface of Base Sheet B was coated twice with the dispersion, using a No. 38 Meyer rod and drying at 107° C. after each coating. The resulting image-receptive melt-transfer layers provided a good crayon-receptive surface, but the surface had a gritty feel. Upon transferring a crayon image to a T-shirt in the Hix press at 163° C. for 20 seconds, the powdered polymer did not melt to a significant extent. Transfers for 30 seconds at temperatures of 191° C. and 218° C. then were attempted. The crayon image transferred well at the higher temperature, although the base sheet released with some difficulty.

EXAMPLE 8

The procedure of Example 6 was repeated, except that the dispersion used to prepare the image-receptive film layer included an equal amount of Binder A in place of Binder C and Polymer E was replaced with 30 parts of Polymer G. The powdered polymer wetted out quickly, milled well, and did not foam. However, drying at the usual 107 degree C. temperature caused the relatively low melting polymer to flow into the melt-transfer film layer. Consequently, the image-receptive film layer did not accept crayon very well. However, transfer in the Hix press at 110°–125° C. for 25 seconds was very good. Similar results were obtained upon replacing Base Sheet B with Base Sheet A. Lower drying temperatures should improve the crayon receptivity of the image-receptive film layer.

EXAMPLE 9

The procedure of Example 6 was repeated, except that the dispersion used to prepare the image-receptive film layer consisted of 200 parts of Binder D (80 parts dry weight), 40 parts of water, and 30 parts of Polymer H. Mixing was adequate, although milling resulted in foaming. The base sheet coated well, with the coating being applied over the melt-transfer film layer. However, there was little crayon acceptance because the powder particles tended to melt at the drying temperature (107° C.). Transfer of the two film layers was complete with such layers being well embedded in the fabric of the T-shirt. Reducing the drying temperature for the second coating to 80° C. resulted in an image-receptive film layer having fair crayon acceptance.

EXAMPLE 10

The procedure of Example 7 was repeated, except that the first film layer was prepared from Binder E at a dried level of 3.0 lbs/1300 ft$^2$ (11 g/m$^2$). Transfer performance at a temperature of 218° C. was similar to that of the heat transfer paper of Example 7, except in this case release of the base sheet was easier.

EXAMPLE 11

Base Sheet C was coated on both sides with Barrier A in the usual fashion at a level when dry of 5.5 lbs/1300 ft$^2$ (21 g/m$^2$). A coating of Binder F was applied over the dried barrier coat at a level when dry of 2.5 lbs/1300 ft$^2$ (9 g/m$^2$). The coating was dried at 107° C. for 60–90 seconds to form a melt-transfer film layer. The melt-transfer film layer then was coated with a dispersion consisting of 286 parts of Binder A (100 parts dry weight), 40 parts of Polymer J, and 5.0 parts of propylene glycol. The coating was applied with a No. 38 Meyer rod and dried at 107° C. The resulting image-receptive film layer was present at a level of 9.2 lbs/1300 ft$^2$ (35 g/m$^2$).

Crayon acceptance of the image-receptive film layer was good. At Hix press temperatures of 163° C. and a press time of 25 seconds, transfer and release form the barrier-coated base sheet both were good. However, fabric penetration by the two transferring layers was not adequate. Increasing press temperature and time to 191° C. and 30 seconds, respectively, improved penetration without adversely affecting ease of release of the barrier-coated base sheet.

Having thus described the invention, numerous changes and modifications thereof will be readily apparent to those having ordinary skill in the art without departing from the spirit or scope of the invention.

What is claimed is:

1. An image-receptive heat transfer paper which comprises:

(a) a flexible cellulosic nonwoven web base sheet having top and bottom surfaces; and (b) an image-receptive melt-transfer film layer overlaying the top surface of said base sheet, which image-receptive melt-transfer film layer comprises from about 15 to about 80 percent by weight of a film-forming binder selected from the group consisting of ethylene-acrylic acid copolymers, polyolefins, and waxes and from about 85 to about 20 percent by weight of a powdered thermoplastic polymer selected from the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65 to about 180 degrees Celsius and said powdered thermoplastic polymer consists of particles which are from about 2 to about 50 micrometers in diameter.

2. The image-receptive heat transfer paper of claim 1, in which said base sheet is a latex-impregnated paper.

3. The image-receptive heat transfer paper of claim 1, in which the thickness of said image receptive melt-transfer film layer is from about 12 to about 80 micrometers.

4. The image-receptive heat transfer paper of claim 1, in which each of said film-forming binder and said powdered thermoplastic polymer melt in the range of from about 80 to about 120 degrees Celsius.

5. The image-receptive heat transfer paper of claim 1, in which said film-forming binder has, at the transfer temperature, a lower melt viscosity than said thermoplastic polymer.

6. An image-receptive heat transfer paper which comprises:

(a) a flexible cellulosic nonwoven web base sheet having top and bottom surfaces;

(b) a melt-transfer film layer overlaying the top surface of said base sheet, which melt transfer film layer comprises a film-forming binder selected from the group consisting of ethylene-acrylic acid copolymers, polyolefins, and waxes and which melts in the range of from about 65 to about 180 degrees Celsius; and (c) an image-receptive film layer overlaying said melt-transfer film layer, which image-receptive film layer comprises from about 15 to about 80 percent by weight of a film-forming binder selected from the group consisting of ethylene-acrylic acid copolymers, polyolefins, and waxes and from about 85 to about 20 percent by weight of a powdered thermoplastic polymer selected from the group consisting of polyolefins, polyesters, polyamides, waxes, epoxy polymers, ethylene-acrylic acid copolymers, and ethylene-vinyl acetate copolymers, wherein each of said film-forming binder and said powdered thermoplastic polymer melts in the range of from about 65 to about 180 degrees Celsius and said powdered thermoplastic polymer consists of particles which are from about 2 to about 50 micrometers in diameter.

7. The image-receptive heat transfer paper of claim 6, in which said base sheet is a latex-impregnated paper.

8. The image-receptive heat transfer paper of claim 6, in which the thickness of said image receptive melt-transfer film layer is from about 12 to about 80 micrometers.

9. The image-receptive heat transfer paper of claim 6, in which each of said film-forming binder and said powdered thermoplastic polymer melt in the range of from about 80 to about 120 degrees Celsius.

10. The image-receptive heat transfer paper of claim 6, in which said film-forming binder has, at the transfer temperature, a lower melt viscosity than said thermoplastic polymer.

* * * * *

UNITED STATES PATENT AND TRADEMARK OFFICE

CERTIFICATE OF CORRECTION

PATENT NO. : 5,242,739

DATED : September 7, 1993

INVENTOR(S) : Kronzer, et al

It is certified that error appears in the above-indentified patent and that said Letters Patent is hereby corrected as shown below:

Column 5, line Table I, "Ethylene-acrylatecopolymers" should read --Ethylene-acrylate copolymers--;

Column 10, line 23, "micrometers. cl Backsize A" should read --micrometes. (with the following heading) Backsize A--

Signed and Sealed this

Twenty-sixth Day of July, 1994

Attest:

BRUCE LEHMAN

*Attesting Officer* *Commissioner of Patents and Trademarks*